(12) United States Patent
Peng et al.

(10) Patent No.: US 6,827,648 B2
(45) Date of Patent: Dec. 7, 2004

(54) WIRELESS CONTROLLER FOR A VIDEO GAME PLAYER

(75) Inventors: Chi-Fu Peng, Chungli (TW); Chiu-Hao Cheng, Miaoli Hsien (TW); Ming-Gwo Cheng, Taichung Hsien (TW)

(73) Assignees: Zeroplus Technology Co., Ltd., Taipei Hsien (TW); Vision Electronics Co., Ltd., Taoyuan Hsien (TW)

( * ) Notice: Subject to any disclaimer, the term of this patent is extended or adjusted under 35 U.S.C. 154(b) by 0 days.

(21) Appl. No.: 10/414,403

(22) Filed: Apr. 16, 2003

(65) Prior Publication Data

US 2004/0209687 A1 Oct. 21, 2004

(51) Int. Cl.⁷ .................................................. A63F 9/24
(52) U.S. Cl. ........................................... 463/36; 463/39
(58) Field of Search .............................. 463/35–39, 47

(56) References Cited

U.S. PATENT DOCUMENTS 5,605,505 A * 2/1997 Han ............................ 463/39
6,238,289 B1 * 5/2001 Sobota et al. ................. 463/39
6,280,327 B1 * 8/2001 Leifer et al. .................. 463/39
6,342,010 B1 * 1/2002 Slifer .......................... 463/39
6,565,441 B1 * 5/2003 Hames et al. ................. 463/39

* cited by examiner

Primary Examiner—Kim Nguyen
(74) Attorney, Agent, or Firm—Bacon & Thomas

(57) ABSTRACT

A wireless controller for a video game player is disclosed. The wireless controller for a video game player comprises a wireless receiver and a sound transformer that are connected with a first memory chip receiver of the video game player. The built-in microphone and amplifier of the wireless receiver allows the user to use the wireless controller to transmit signals and communicate with the wireless receiver wirelessly. Thus without using headset and microphone, the user can control the wireless controller and also communicate with the other online player within an effective transmission range.

7 Claims, 6 Drawing Sheets

WIRELESS CONTROLLER FOR A VIDEO GAME PLAYER

BACKGROUND OF THE INVENTION

1. The Field of the Invention

The present invention relates to a wireless controller for a video game player, and more particularly relates to a wireless controller for a video game player comprising a wireless receiver and a sound transformer that are connected with a first memory chip receiver of the video game player. The built-in microphone and the amplifier of the wireless receiver allow the user to use the wireless controller to transmit signals and communicate with the wireless receiver wirelessly. Thus without using headset with microphone, the user can control the wireless controller and also communicate with the other online player within an effective transmission range.

2. Description of the Related Art

Nowadays, online game is very popular and all the manufacturers of game players continue developing newer game players for the recreation of on-line users. For capitalizing the market, the manufacturers of game players provide various peripheral products for facilitating the video game player in view of user friendly control and convenience, for example, some manufacturers have design a headset with microphone in order to allow the user to communicate with other online game players in order to create more fun for the online users while playing the game.

Referring to FIGS. 1A, 1B, 1C and 2, show a conventional video game player. As shown, the video game system A10 (XBox of Microsoft) comprises a controller A20, a sound transformer A30, and a sound device A40. The sound device A40 comprises a headset A41 with microphone A42 particularly for the online game. A first memory chip receiver A22 of the controller A20 is for receiving the sound transformer A30 with an external card bus, and the sound transformer A30 is used as a communication medium between the second communication interface A35 and the controller A20. A sound transmission wire A43 is used as a communication medium between the headset A41 with microphone A42 and the headset jack A34 with sound transformer A30. Thus the first control circuit A21 and first communication interface A25 of the controller A20 is able to communicate with the video game system A10. Further, the controller A20 comprises a second memory chip receiver A23 and a button A24, wherein the second memory chip receiver A23 is a prescribed slot and the button A24 is for controlling the game and for switching the functions. The sound transformer A30 comprises a second control circuit A31, a volume control button A32 and a microphone switch A33. The volume control button A32 is for controlling the volume of the headset A41 and the microphone switch A33 is for turning the microphone A42 on or off through the second control circuit A31.

However, the above conventional video game player has several defects as follows:

1. The specification of the headset A41 and the microphone A42 are different from the one available in the market, and therefore the user has to purchase the video game player together with the sound transformer A30 as a set if any one of the headset A41 or microphone A42 is out of order. Therefore, it is expensive for the user to replace the whole video game player.

2. The headset A41 and microphone A42 need to communicate with sound transformer A30 through the sound transmission wire A43, thus could cause inconvenience to the user, for example, entanglement of the sound transmission wire A43 and/or limited length of the sound transmission wire A43, while using the controller A20.

3. The headset A41 and microphone A42 are directly held on the user's ear, this would be uncomfortable to the user after long-hour usage due to the weight of the headset A41 and microphone A42.

4. The user is unable to move freely because of the sound transmission wire 43 and controller transmission wire.

5. The user is unable to control the volume and turning the microphone A42 on or off instantly, thus the fun of playing by such controller A20 will not be as much as desired.

Therefore, it is highly desirable to improve the video game player in order to overcome the above defects of the prior art.

SUMMARY OF THE INVENTION

Accordingly, in the view of the foregoing, the present inventor makes a detailed study of related art to evaluate and consider, and uses years of accumulated experience in this field, and through several experiments, to create a new wireless controller for video game player. The present invention provides an innovated cost effective wireless controller for video game player, which would allow the user to control the controller wirelessly within an effective range providing great convenience and recreation to the user while playing the game.

According to an aspect of the present invention, the connection to the wireless controller is accomplished in an orderly fashion, wherein signals input by a button on the wireless controller is transmitted in an orderly fashion to a third control circuit, a second wireless receiving/transmitting circuit and a first wireless receiving/transmitting circuit. The signal is further transmitted to a first control circuit, and then finally transmitted to a video game system through the first communication interface. The wireless controller is used for transmitting the signal and control the wireless receiver wirelessly. Further, the wireless controller has a button for controlling the volume of the amplifier and for turning the microphone of the wireless receiver on or off. Therefore, the user need not hold the wired controller or wear the headset with microphone to play the game for communicating with the other players.

BRIEF DESCRIPTION OF THE DRAWING

For a more complete understanding of the present invention, reference will now be made to the following detailed description of preferred embodiments taken in conjunction with the accompanying drawings, in which.

DETAILED DESCRIPTION OF PREFERRED EMBODIMENTS

Figure 1A:
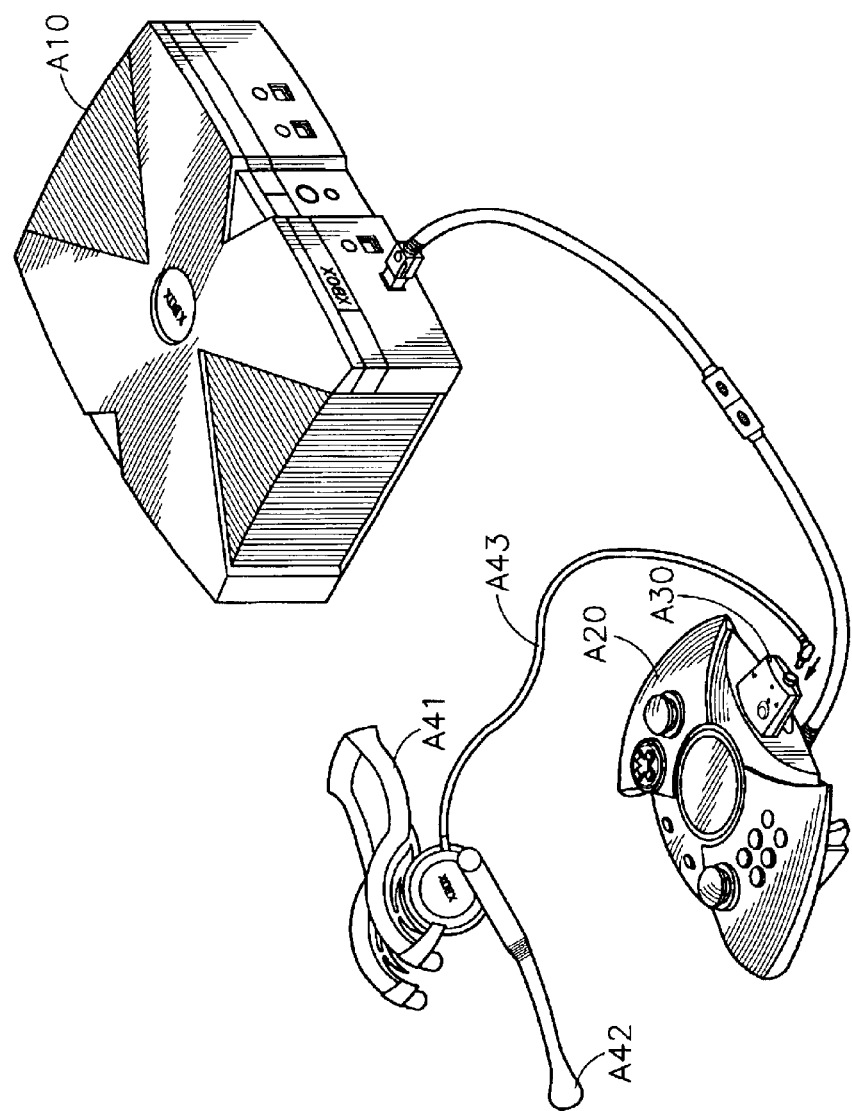
FIG. 1A is an elevational view of a conventional video game player with a headset.
Figure 1B:
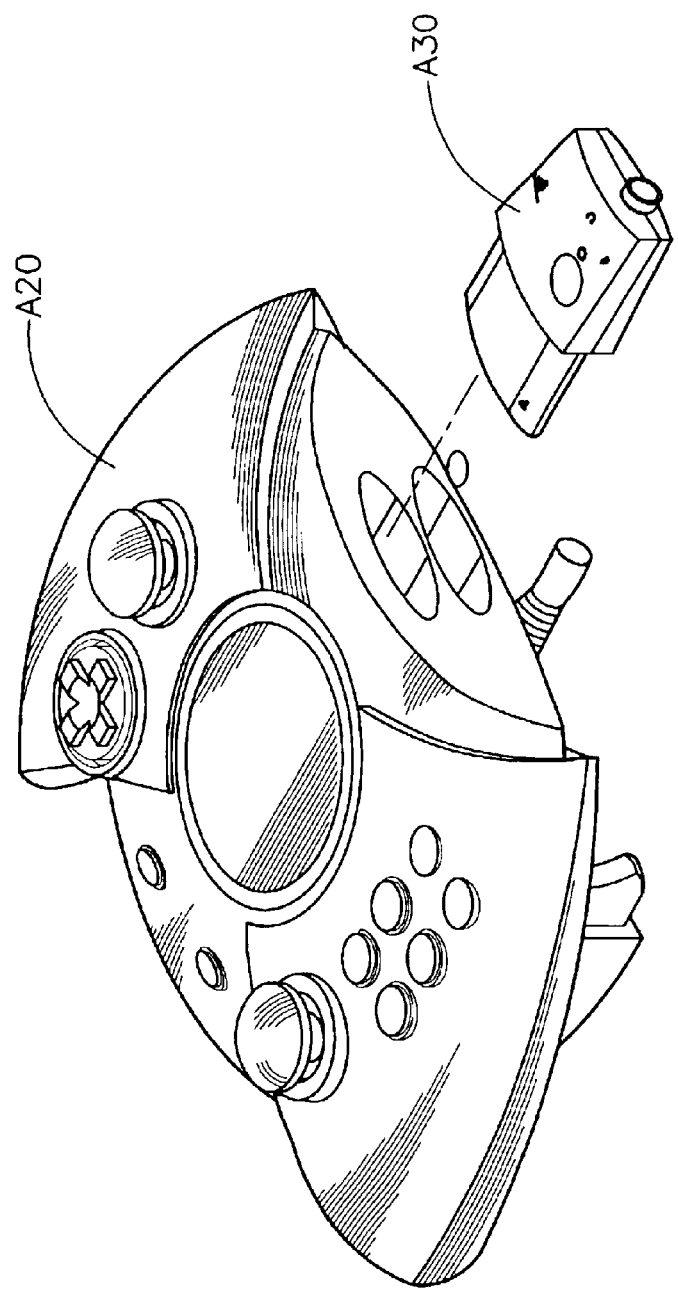
FIG. 1B is an elevational view of a controller and a sound transformer of the conventional video game player.
Figure 1C:
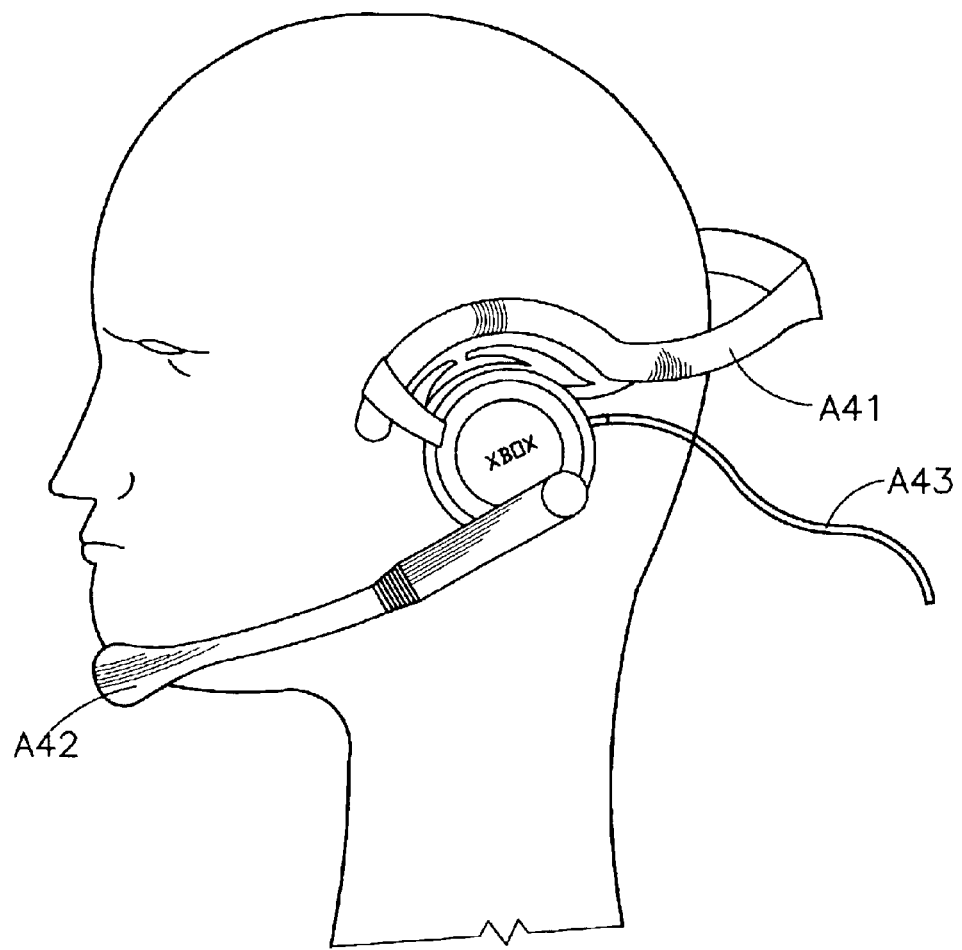
FIG. 1C is a perspective view of a headset of the conventional video game player.
Figure 2:
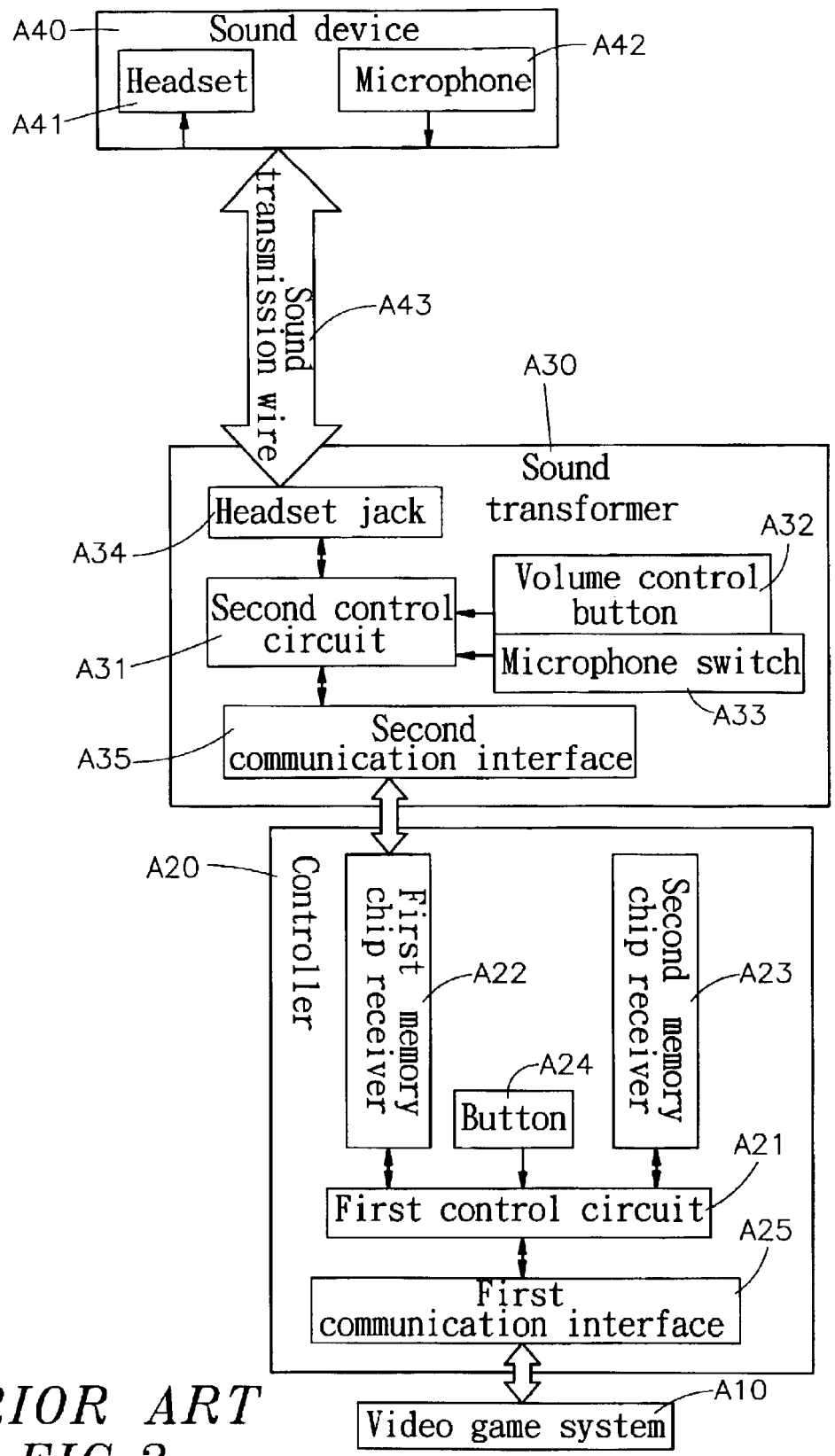
FIG. 2 is an actual functioning flow chart of the video game player according to the prior art.

Reference will be made in detail to the preferred embodiments of the invention, examples of which are illustrated in the accompanying drawings. Wherever possible, the same reference numbers are used in the drawings and the description to refer to the same or like parts.

Figure 3:
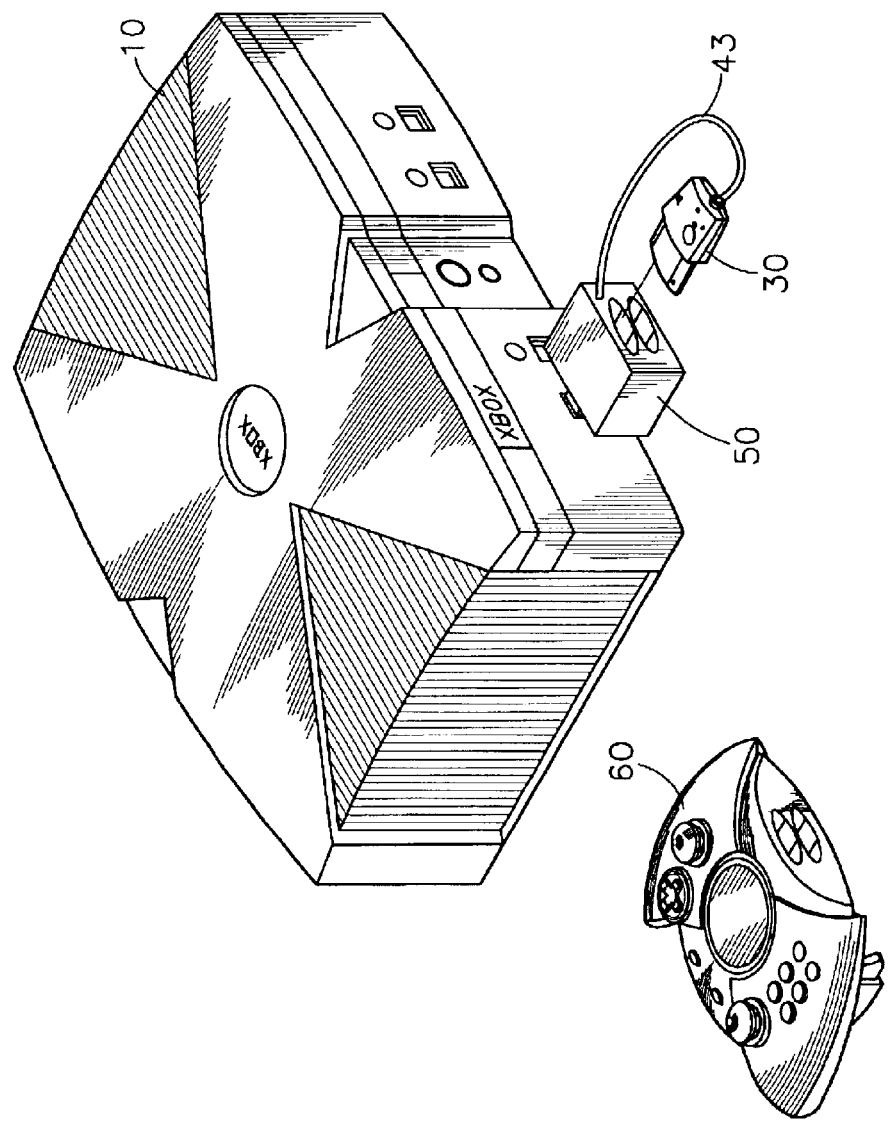
FIG. 3 is an elevational view of a video game player of the present invention.
Figure 4:
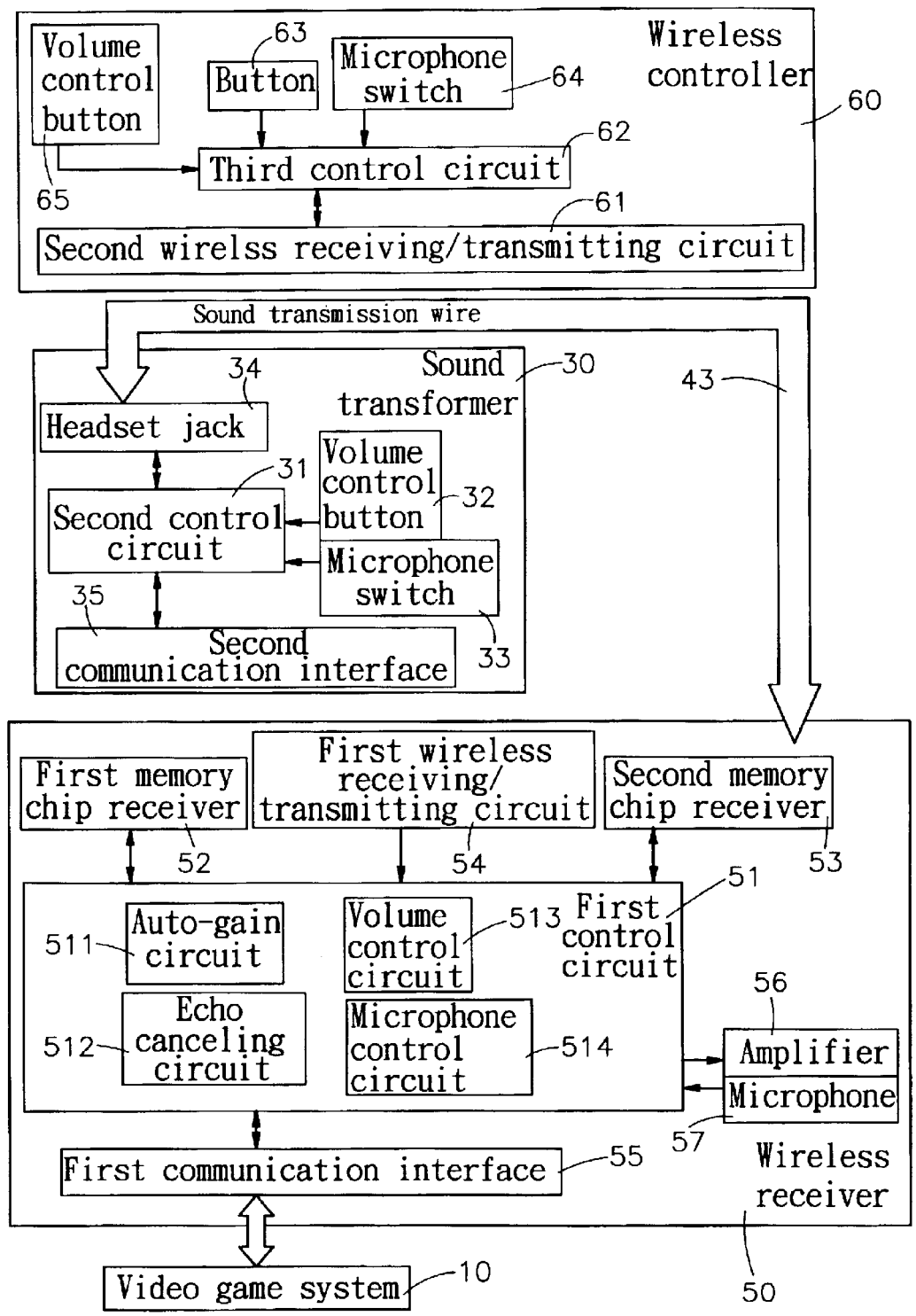
FIG. 4 is an actual functioning flow chart of the video game player of the present invention.

Referring to FIGS. 3 and 4, the wireless controller for a video game player of the present invention comprises a video game system 10 and a wireless receiver 50, wherein the video game system 10 is connected to a wireless receiver 50. The wireless receiver 50 is for receiving a sound transformer 30. The wireless receiver 50 comprises a first communication interface 55 for connecting with the video game system 10, and a first control circuit 51 is conjunct with the first communication interface 55. The first control circuit 51 comprises a first memory chip receiver 52, a second memory chip receiver 53, a first wireless receiving/transmitting circuit 54, an amplifier 56 and a microphone 57. The first memory chip receiver 52 is connected to a second communication interface 35 of the sound transformer 30, and the first wireless receiving/transmitting circuit 54 is connected to a second wireless receiving/transmitting circuit 61 of a wireless controller 60 for signal communication.

The sound transformer 30 comprises a second control circuit 31, a volume control button 32, a microphone switch 33, a headset jack 34 and a second communication interface 35 connecting with the second control circuit 31, wherein the headset jack 34 is connected with the first control circuit 51 of the wireless receiver 50 through a sound transmission wire 43.

The wireless controller 60 comprises a third control circuit 62, a second wireless receiving/transmitting circuit 61, a button 63, a microphone switch 64 and a volume control button 65, wherein the second wireless receiving/transmitting circuit 61, the button 63, the microphone switch 64 and the volume control button 65 are connected to said third control circuit 62.

As described above, the wireless receiver 50 is connected to the video game system 10, and the first memory chip receiver 52 of the wireless receiver 50 is for receiving a sound transformer 30 and the headset jack 34 is connected with the sound first control circuit 51 of the wireless receiver 50 through a sound transmission wire 43.

The actual functioning of the wireless controller for a video game player of the present invention will now be described as follows. The signals input by the button 63 on the wireless controller 60 is transmitted in a orderly fashion to the third control circuit 62, the second wireless receiving/transmitting circuit 61 and the first wireless receiving/transmitting circuit 54, the signal is further transmitted to the first control circuit 51, and then finally transmitted to the video game system 10 through the first communication interface 55.

According to another embodiment of the present invention, the wireless controller 60 comprises a microphone switch 64 and a volume control button 65 for turning the microphone 57 on or off and for adjusting the amplifier 56 of the wireless receiver 50 respectively. When the user adjusts the microphone switch 64 or the volume control button 65, the signal will be transmitted by the third control circuit 62 and the second wireless receiving/transmitting circuit 61 to the first wireless receiving/transmitting circuit 54 of first wireless receiver 50, then to the first control circuit 51 to finally control the microphone 57 or the amplifier 56 as desired.

The user can also adjust the microphone 57 and the amplifier 56 of the wireless receiver 50 by operating the volume control button 32 and microphone switch 33 that is set on the sound transformer 30. When the user operates the volume control button 32 and the microphone switch 33, the signal is transmitted to the headset jack 34 through the second control circuit 31, then to the first control circuit 51 through the sound transmission wire 43, to control the amplifier 56 and the microphone 57 respectively.

Furthermore, the first control circuit 51 comprises an auto-gain circuit 511, an echo canceling circuit 512, a volume control circuit 513 and a microphone control circuit 514. The auto-gain circuit 511 is for balancing the over-loud or over low volume, and the echo canceling circuit 512 is for canceling the cross-talk. The volume control circuit 513 is for controlling the volume of the amplifier 56, and the microphone control circuit 514 is for controlling the microphone 57 to receive sound signal.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What is claimed is:

1. A wireless controller for a video game player comprising:

a wireless receiver connected to said video game player, comprising a first control circuit, a first communication interface, a first receiving/transmitting circuit, a first memory chip receiver, a second memory chip receiver, a communication interface, an amplifier and a microphone, wherein the first receiving/transmitting circuit, the first memory chip receiver, the second memory chip receiver, the communication interface, the amplifier and the microphone are connected to said first control circuit;

a sound transformer connected to another side of said wireless receiver, comprising a second control circuit and a headset jack, and a second communication interface is connected to said second control circuit, wherein said headset jack is connected to said wireless receiver through a sound transmission wire, and said second communication interface is conjunct in said first memory chip receiver; and a wireless controller comprising a third control circuit and a second wireless receiving/transmitting circuit is connected to said third control circuit, wherein said first wireless receiving/transmitting circuit can communicate with said second wireless receiving/transmitting circuit.

2. The wireless controller for the video game player according to claim 1, wherein said third control circuit of the wireless controller is connected to a volume control button.

3. The wireless controller for the video game player according to claim 1, wherein said third control circuit of the wireless controller is connected to a microphone switch.

4. The wireless controller for the video game player according to claim 1, wherein said first control circuit of the wireless controller further comprises an auto-gain circuit for balancing over loud and low volume.

5. The wireless controller for the video game player according to claim 1, wherein said first control circuit of the wireless controller further comprises an echo canceling circuit for canceling a cross-talk.

6. The wireless controller for the video game player according to claim 1, wherein said first control circuit of the wireless controller further comprises and echo canceling circuit for controlling the volume of the amplifier.

7. The wireless controller for the video game player according to claim 1, wherein said first control circuit of the wireless controller further comprises a microphone control circuit for said microphone to receive sound signal.

* * * * *